US008396097B1

(12) United States Patent
Giallorenzi et al.

(10) Patent No.: US 8,396,097 B1
(45) Date of Patent: Mar. 12, 2013

(54) IIR SLIDING WINDOW INTEGRATOR AND SEARCH ENGINE DELAY COMPONENT FOR REDUCING THE PREAMBLE SIZE OF A DISCOVERY BURST

(75) Inventors: Thomas R. Giallorenzi, Riverton, UT (US); Johnny M. Harris, Centerville, UT (US); Matthew A. Lake, Salt Lake City, UT (US); Samuel C. Kingston, Salt Lake City, UT (US); Myren Iverson, Layton, UT (US)

(73) Assignee: L-3 Communications Corp, New York, NY (US)

( * ) Notice: Subject to any disclaimer, the term of this patent is extended or adjusted under 35 U.S.C. 154(b) by 1626 days.

(21) Appl. No.: 11/821,741

(22) Filed: Jun. 25, 2007

(51) Int. Cl.
*H04B 1/00* (2006.01)

(52) U.S. Cl. ........ 375/150; 375/142; 375/343; 375/134; 375/145; 375/149; 375/E1.003; 375/E1.008; 375/137

(58) Field of Classification Search .................. 375/150, 375/152, 343, 208, 142, 145, 149, E1.003, 375/E1.008, 134, 137; 708/422, 425, 813
See application file for complete search history.

(56) References Cited

U.S. PATENT DOCUMENTS

| | | | | |
|---|---|---|---|---|
| 6,577,674 B1 * | 6/2003 | Ko et al. | ........................ | 375/148 |
| 6,735,243 B1 * | 5/2004 | Akopian | ........................ | 375/150 |
| 7,164,736 B2 * | 1/2007 | Sahai et al. | ........................ | 375/343 |
| 7,421,055 B2 * | 9/2008 | Sekizawa | ........................ | 375/377 |
| 7,436,878 B1 | 10/2008 | Harris et al. | ........................ | 375/142 |
| 7,526,010 B1 | 4/2009 | Harris et al. | ........................ | 375/140 |
| 7,602,834 B1 * | 10/2009 | Giallorenzi et al. | ........................ | 375/130 |
| 7,602,835 B1 | 10/2009 | Kingston et al. | ........................ | 375/142 |
| 7,606,292 B1 | 10/2009 | Harris et al. | ........................ | 375/142 |
| 7,609,751 B1 | 10/2009 | Giallorenzi et al. | ........................ | 375/142 |
| 7,701,996 B1 | 4/2010 | Giallorenzi et al. | ........................ | 375/130 |
| 2004/0028160 A1 * | 2/2004 | Bienek et al. | ........................ | 375/354 |
| 2006/0165157 A1 * | 7/2006 | Griffin et al. | ........................ | 375/147 |

* cited by examiner

*Primary Examiner* — Daniel Washburn
*Assistant Examiner* — Rahel Guarino
(74) *Attorney, Agent, or Firm* — Kirton McConkie

(57) ABSTRACT

In one exemplary embodiment of the invention, a device includes: a first frequency search engine configured to receive input values and determine a frequency of a signal to be within a first frequency band; a second delay component configured to store at least a portion of the plurality of input values; and a second frequency search engine configured to determine the frequency of the signal to be within a second band that is a subset of the first band. The first frequency search engine includes: a shift register configured to store bits of the input values; a combining circuit configured to combine bits of the plurality of input values; a first delay component configured to serially store a plurality of accumulator values; and a feedback circuit configured to add a function of the first delay component output to a next accumulator value to obtain a modified next accumulator value.

29 Claims, 9 Drawing Sheets

IIR SLIDING WINDOW INTEGRATOR AND SEARCH ENGINE DELAY COMPONENT FOR REDUCING THE PREAMBLE SIZE OF A DISCOVERY BURST

TECHNICAL FIELD

The teachings in accordance with the exemplary embodiments of this invention relate generally to node discovery methods and apparatus, and are particularly advantageous when used to lock onto a preamble of a discovery burst.

BACKGROUND

In a traditional pseudo-random noise correlation accumulator (PNCA), the accumulation of energy for $M_{dwell}$ symbols occurs on regular intervals (for example, every 50 symbols) and the result of this accumulation is compared with a threshold. If the accumulated energy is not higher than the threshold, indicating that the candidate time alignment is incorrect and the signal is not locked, the accumulator is purged and a new lock is attempted on a different 50 symbol increment of the received signal. One problem that this approach poses is that the integration periods are not necessarily aligned with the beginning of an incoming burst in the search engine. As a result, it is likely that at the beginning of the burst, one lock attempt will accumulate in the PNCA some number of symbols of noise (e.g. prior to the burst beginning) and some number of symbols of signal. If the signal to noise ratio (SNR) of the incoming burst is low, as will often be the case for a discovery burst from a maximum-range hailing node, then it is likely that the detection threshold will not be tripped during that dwell and there will correctly be no signal lock. In the worst case scenario, the first PNCA attempt just misses locking onto the signal and must iteratively search each 50 symbol string until the despreading code aligns. This worst case scenario mandates a burst preamble length of at least $2M_{dwell}$ to that the PNCA can lock the burst onto the spread signal before the payload of burst begins.

SUMMARY

In an exemplary aspect of the invention, an electronic device is provided. The electronic device includes: a first frequency search engine; a second delay component; and a second frequency search engine. The first frequency search engine is configured to receive a plurality of input values and to determine a frequency of a corresponding signal to be within a first frequency band. The first frequency search engine includes: a shift register, having an input coupled to an input of the first frequency search engine, configured to store bits of the input values; a combining circuit, having an input coupled to an input of the first frequency search engine, configured to combine bits of the plurality of input values to produce a correlator output; a first delay component, having an input coupled to an output of the combining circuit, configured to serially store a plurality of accumulator values, wherein the serially-stored plurality of accumulator values comprises the correlator outputs; and a feedback circuit, coupled to the first delay component, configured to add a function of an output of the first delay component to a next accumulator value of the first delay component to obtain a modified next accumulator value, wherein the output of the first delay component is coupled to an output of the first frequency search engine. The second delay component has an input coupled to an input of the first frequency search engine. The second delay component is configured to store at least a portion of the plurality of input values. The second frequency search engine has inputs coupled to an output of the second delay component and to an output of the first frequency search engine. The second frequency search engine is configured, using the stored at least a portion of the plurality of input values and the first frequency band, to determine the frequency of the signal to be within a second frequency band, where the second frequency band is a subset of the first frequency band.

In another exemplary aspect of the invention, a method is provided for processing a received signal. The method includes the following steps: combining a plurality of input bits to produce a first correlator output; using the first correlator output, filling a register with a first accumulator value followed by a series of other accumulator values; shifting the plurality of input bits; combining the shifted plurality of input bits to produce a second correlator output comprising a next accumulator value; adding a function of the first accumulator value to the next accumulator value to obtain a modified next accumulator value; inputting the modified next accumulator value to the register while shifting the series of other accumulator values in the register; and comparing the modified next accumulator value with a threshold value to determine if a specified signal or a specified portion of a signal is detected.

In a further exemplary aspect of the invention, a circuit is provided. The circuit includes: a combining circuit configured to combine a plurality of input bits to produce a correlator output, wherein the combining circuit is further configured to combine a shifted plurality of the input bits to produce a next correlator output; a delay register, having an input coupled to an output of the combining circuit, configured to serially store a plurality of accumulator values, wherein the serially-stored plurality of accumulator values comprises the correlator outputs; and a feedback circuit, coupled to the delay register, configured to add a function of an output of the delay register to a next accumulator value of the delay register to obtain a modified next accumulator value.

In another exemplary aspect of the invention, a method is provided. The method includes the following steps: using a plurality of input values, determining a frequency of a corresponding signal to be within a first frequency band; storing at least a portion of the plurality of input values; and, using the stored at least a portion of the plurality of input values, determining the frequency of the signal to be within a second frequency, wherein the second frequency band is a subset of the first frequency band.

In a further exemplary aspect of the invention, a receiver is provided. The receiver includes: a first frequency search engine configured to receive a plurality of input values and to determine a frequency of a corresponding signal to be within a first frequency band; a delay component, having an input coupled to an input of the frequency search engine, configured to store at least a portion of the plurality of input values; and a second frequency search engine, having inputs coupled to an output of the delay component and to an output of the first frequency search engine, configured, using the stored at least a portion of the plurality of input values and the first frequency band, to determine the frequency of the signal to be within a second frequency band, where the second frequency band is a subset of the first frequency band.

In another exemplary aspect of the invention, an electronic device is provided. The electronic device includes: means for receiving a plurality of input values; means for determining a frequency of a signal corresponding to the plurality of input values to be within a first frequency band; means for storing at least a portion of the plurality of input values; and, using the first frequency band and the stored at least a portion of the plurality of input values, means for determining the frequency of the signal to be within a second frequency band, wherein the second frequency band is a subset of the first frequency band.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
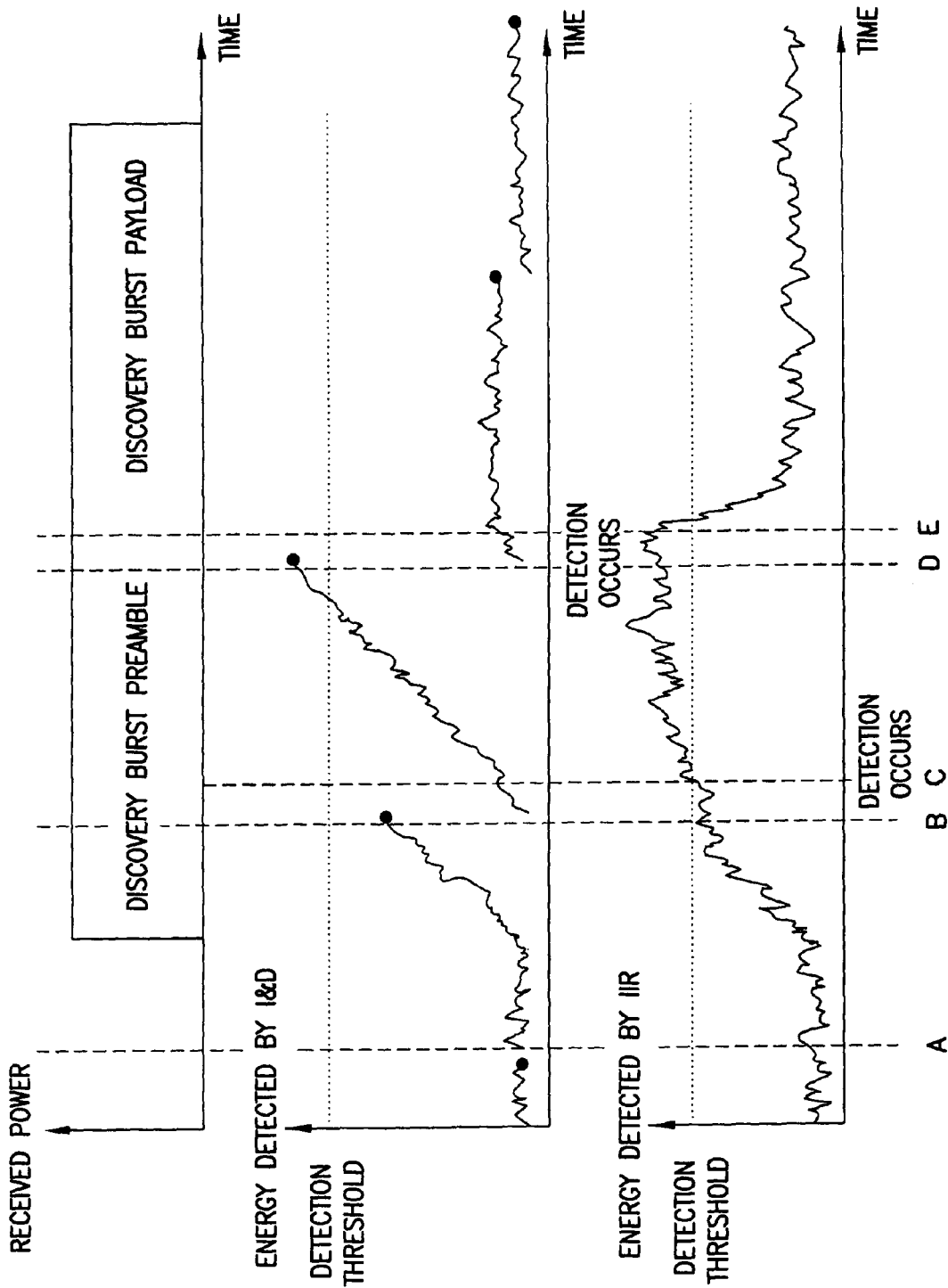
FIG. 1 shows a series of graphs illustrating the energy detection difference between a conventional integrate and dump approach and an infinite impulse response (IIR) sliding window integrator of the invention.

The invention implements an infinite impulse response (IIR) style sliding window integrator that, worst case, despreads a preamble that is less than length $2M_{dwell}$. FIG. 1 illustrates the energy detection difference between a conventional integrate and dump approach (I&D) and an IIR sliding window integrator according to an exemplary embodiment of the invention. As is apparent, the detection threshold for the IIR integrator is tripped earlier than the detection threshold for the I&D integrator. Hence, using the IIR integrator, there is no need to lengthen the preamble to $2M_{dwell}$ insure that the PNCA dwell is completed before the payload of the burst begins (i.e. a shorter preamble can be used).

As noted above, a conventional I&D integrator accumulates energy for $M_{dwell}$ symbols on regular intervals, comparing the end result with a threshold to determine if the signal is locked. If the threshold is not met, the I&D integrator purges the accumulated symbols and attempts a new lock on a subsequent interval (e.g. integration period) of symbols. Referring to FIG. 1, the beginning/end of each integration period that is checked by the I&D integrator is indicated by a circle on the I&D graph, as can be seen at times A, B and D. These period borderlines are also easily noted by the purging of the accumulated energy, e.g. where the I&D graph sharply drops to a lower value, usually zero, during the discovery burst preamble. At time E, the discovery burst preamble ends and the discovery burst payload begins.

At time A, the I&D integrator begins a first integration period. As can be seen by the top graph in FIG. 1, the discovery burst preamble has not begun. Thus, during the first integration period (time A to time B), the I&D integrator is accumulating some number of symbols of noise. Although the discovery burst preamble begins during the first integration period, due to the symbols of noise, the I&D integrator does not detect the discovery burst preamble and lock onto the signal during this period. Thus, at time B, with no detection having been made, the I&D integrator purges its accumulated energy and begins accumulating during a second integration period (time B to time D). Since the discovery burst preamble began prior to the start time of the second integration period (time B), during the second integration period the I&D integrator is accumulating energy entirely from symbols of the discovery burst preamble. Thus, by the time the I&D integrator finishes the second period at time D, the accumulated energy has passed the threshold and the discovery burst preamble is correctly detected. Since each period of accumulation by the I&D integrator is $M_{dwell}$ symbols long, to insure that that a discovery burst preamble is correctly detected, the preamble must be $2M_{dwell}$ symbols in length. This is because it may take up to two periods of accumulation by the I&D integrator to detect the preamble.

In comparison, the IIR integrator does not purge accumulated symbols at regular intervals. Instead the IIR integrator uses a sliding window to continuously accumulate symbols. As shown in FIG. 1, at time B the accumulated energy for the IIR integrator does not fall to a lower value. By using the sliding window to continuously accumulate symbols, the IIR integrator is able to correctly detect the discovery burst preamble at time C. As can be observed, time C is earlier than time D. Hence, the IIR integrator is able to detect the discovery burst preamble sooner than the conventional I&D integrator. Because a preamble of length $2M_{dwell}$ is not necessary when using the IIR integrator, as would be required when using conventional I&D integrator, this implies that a shorter preamble length may be employed with the IIR integrator.

Figure 2:
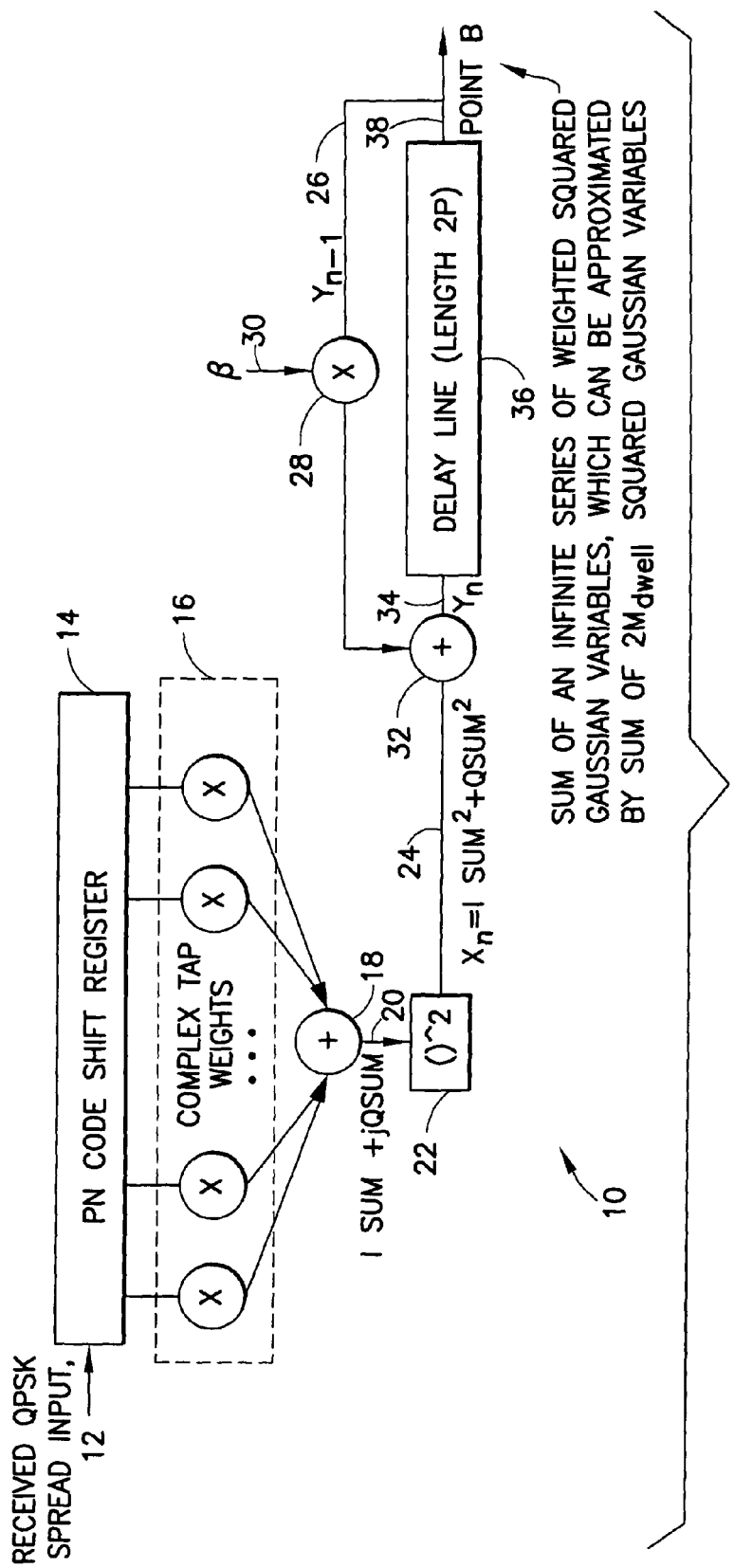
FIG. 2 is a block diagram of a despreader employing a sliding window integrator using an IIR-style integrator.

Referring to FIG. 2, a block diagram of a despreader 10 employing a sliding window integrator using an IIR-style integrator is shown. A received QPSK spread input 12 is received by a PN code shift register 14. A plurality of multipliers 16 apply a despreading code by multiplying the outputs of the register 14 by complex tap weights (the despreading code). The outputs of the multipliers 16 are summed by an adder 18. The result, ISUM+jQSUM 20, is squared 22 to obtain $x_n$=ISUM$^2$+QSUM$^2$ 24. The sliding window accumulates continuously, and, for each iteration, a multiplier 28 weights the old accumulated value, $y_{n-1}$ 26, by a feedback tap, $\beta$ 30. An adder 32 then sums the weighted value (the output of the multiplier 28) with the new input, $x_n$ 24, for that same PN code phase. The result, $y_n$ 34, passes through a delay line shift register 36 of length 2P, where P is the length of the spreading code, to arrive at an output 38. The output 38 is a sum of a series of weighted squared Gaussian variables (an infinite sum when run continuously), which can be approximated by the sum of $2M_{dwell}$ squared Gaussian variables.

To analyze the performance of this approach, the decision statistic can be expressed as $$y_n = \beta \cdot y_{n-1} + x_n = \sum_{i=-\infty}^{n} \beta^{n-i} x_i \qquad (1)$$

where $x_n$ is a random variable based on a distribution and n is a time increment indicative of the $n^{th}$ realization of the process.

If only noise is present at the search engine input, then the first two moments of $y_n$ are the following:

$$E[y_n] = \sum_{i=-\infty}^{n} \beta^{n-i} E[x_i] = 0 \qquad (2)$$

$$E[y_n^2] = E\left[\left(\sum_{i=-\infty}^{n} \beta^{n-i} x_i\right) \cdot \left(\sum_{j=-\infty}^{n} \beta^{n-j} x_j\right)\right] = \qquad (3)$$

$$\sum_{i=-\infty}^{n} \beta^{2n-2i} E[x_i^2] = \sigma_x^2 \sum_{i=0}^{\infty} \beta^{2i} = \frac{\sigma_x^2}{1-\beta^2}$$

If a signal is present at a level of A for M symbols at the search engine input, then the signal level is $$E[y_n] = A \cdot \sum_{i=0}^{M-1} \beta^i = A \cdot \frac{1-\beta^M}{1-\beta} \qquad (4)$$

The SNR is:

$$SNR = \frac{A^2}{\sigma_x^2} \cdot \frac{(1-\beta^M)^2}{(1-\beta)^2} \cdot (1-\beta^2) = \frac{A^2}{\sigma_x^2} \cdot (1-\beta^M)^2 \cdot \frac{1+\beta}{1-\beta} \qquad (5)$$

where $\sigma_x$ is the standard deviation of $x_n$ and $\sigma_x^2$ is the variance of $x_n$.

If the substitution $\alpha = 1-\beta$ is made, then this SNR can be written as $$SNR = \frac{A^2}{\sigma_x^2} \cdot (1-e^{\ln(1-\alpha)M})^2 \cdot \frac{2-\alpha}{\alpha} \qquad (6)$$

For small values of $\alpha$, $\ln(1-\alpha) \cong \alpha$. As a result, $$SNR \approx \frac{A^2}{\sigma_x^2} \cdot (1-e^{-\alpha M})^2 \cdot \frac{2}{\alpha} \qquad (7)$$

To find the maximum SNR, one solves for the $\alpha$ value that satisfies $$\frac{dSNR}{d\alpha} \approx \frac{4Me^{-\alpha M}(1-e^{-\alpha M})}{\alpha} - \frac{2(1-e^{-\alpha M})}{\alpha^2} = 0 \qquad (8)$$

This produces $$2 \cdot \alpha \cdot M \cdot e^{-\alpha M} + e^{-\alpha M} = 1 \qquad (9)$$

Numerically, one can determine that $\alpha M = 1.26$. This implies that $$SNR \approx \frac{A^2}{\sigma_x^2} \cdot 0.815 \cdot M \qquad (10)$$

Figure 3:
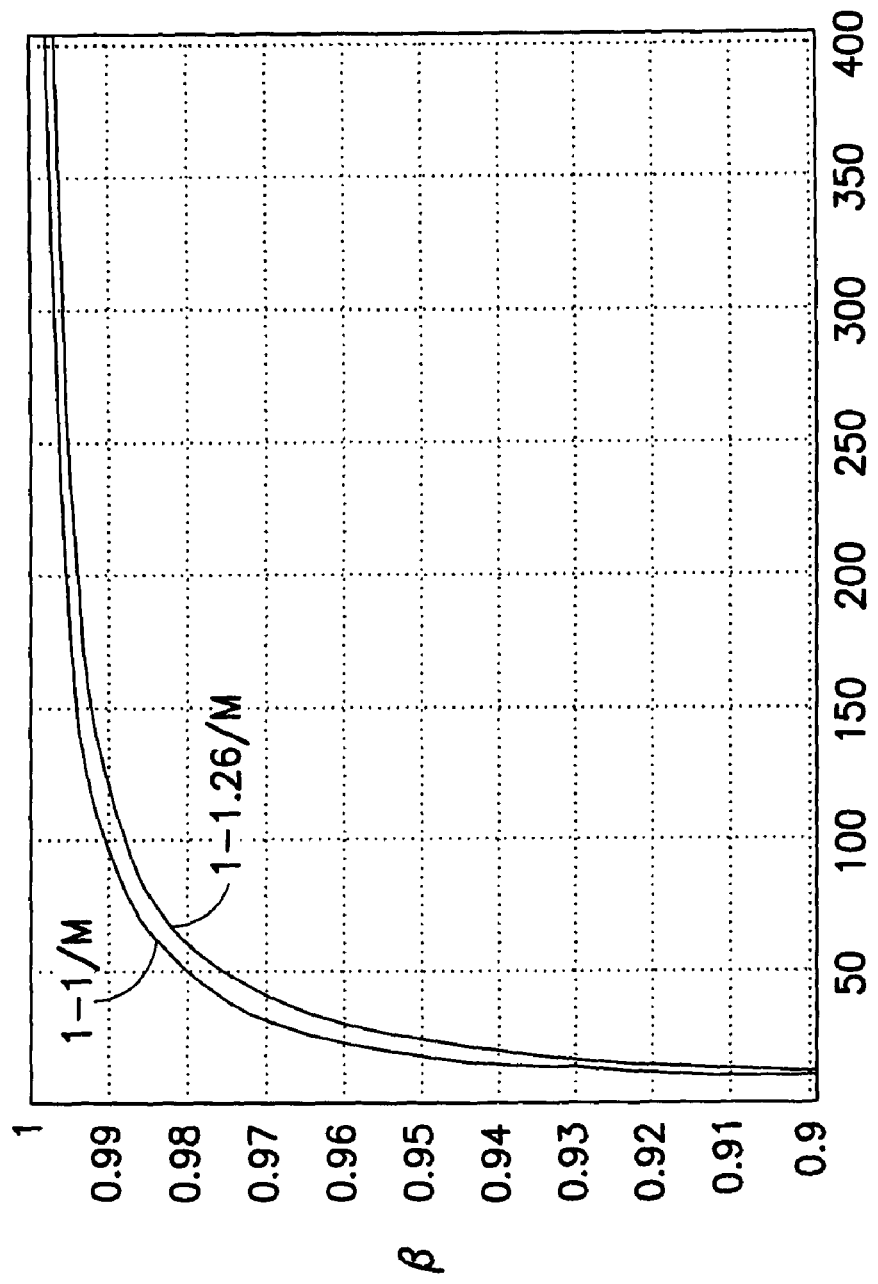
FIG. 3 shows a graph plotting the optimum feedback tap value ($\beta$) versus the averaging time (M)

Equation 4 implies that the optimum value of $\beta$ is $\beta = 1 - (1.26/M)$. In FIG. 3, this optimum feedback tap value is plotted versus M. A naive choice of $\beta$ might be $\beta = 1 - (1/M)$ since intuition says that if one wants an effective averaging time of 100 symbols, for example, that one should set $\beta = 0.99$. This sub-optimum choice of $\beta$ is shown for comparison's sake.

To compare this result, one must repeat this exercise for the integrate and dump PNCA detector. For this detector, $$y_n = \sum_{i=0}^{M-1} x_n \qquad (11)$$

If only noise is present at the search engine input, then the first two moments of $y_n$ are the following:

$$E[y_n] = \sum_{i=0}^{M-1} E[x_i] = 0 \qquad (12)$$

$$E[y_n^2] = E\left[\left(\sum_{i=0}^{M-1} x_i\right) \cdot \left(\sum_{j=0}^{M-1} x_j\right)\right] = \sum_{i=0}^{M-1} E[x_i^2] = M \cdot \sigma_x^2 \qquad (13)$$

When a signal is present at the search engine input, then $$E[y_n] = \sum_{i=0}^{M-1} E[x_i] = A \cdot M \qquad (14)$$

So it follows that the SNR for the PNCA integrate and dump detector is given by $$SNR = \frac{A^2}{\sigma_x^2} \cdot \frac{M^2}{M} = \frac{A^2}{\sigma_x^2} \cdot M \qquad (15)$$

Thus, one can see by comparing Equation 10 with Equation 15 that the IIR detector is equivalent to the integrate and dump with a signal level reduced by $(0.815)^{1/2} = 0.903$. This means that if the spreading code is length M=50 symbols, then the IIR version of this will require $M_{dwell} = 50/0.815 = 62$ symbols to achieve the same SNR and thus the same detection probability ($P_d$) and false alarm probability ($P_{fa}$). If one compares this with the roughly $2M_{dwell} = 100$ symbols that are required by the PNCA detector whose integrate and dump dwell phase is not synchronized with the incoming burst (thus requiring a preamble length of $2M_{dwell}$ to insure that at least one dwell will completely overlap the preamble), then one see that the IIR sliding window approach is the better solution as it ensures that the detector identifies the burst sooner than the traditional PNCA. Note that for the IIR version $M_{dwell} = M/0.815$ where the integrate and dump (I&D) dwell phase is equivalent to the length of the spreading code, M. This means that the IIR version $M_{dwell}$ must be approximately 22.6% longer (1/0.815) than M.

It should be noted that hardware complexity can be traded for preamble size. In such a manner, one can consider what would happen if PNCA hardware is scaled such that the PNCA search engine requires a same length preamble as the ACP Search Engine. In such a way, one can compare the complexity of the two approaches.

Figure 4:
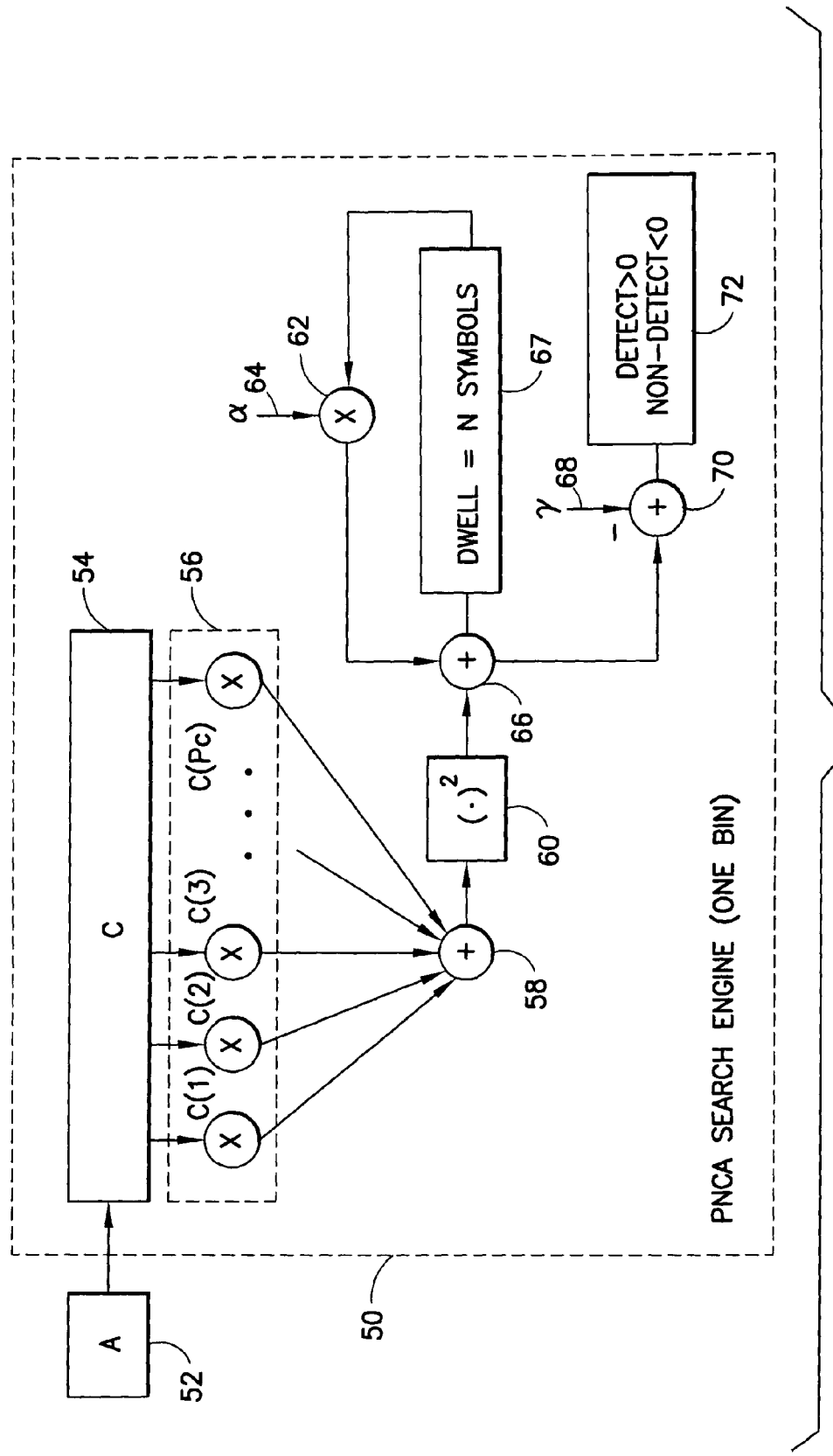
FIG. 4 illustrates an exemplary Pseudo-Random Noise Correlation Accumulator (PNCA) search engine.

FIG. 4 illustrates an exemplary PNCA search engine 50 having one bin. The PNCA search engine 50 functions in a similar manner to the despreader 10 shown in FIG. 2. In FIG. 4, one or more despreaders (e.g., a plurality of despreaders acting in series), represented in FIG. 4 by despreader A 52, provide an input to the PNCA search engine 50. The input is received by a shift register C 54. A plurality of multipliers 56 (numbered C(1) through C($P_C$)) apply a despreading code by multiplying the outputs of the register C 54 by complex tap weights (i.e. the despreading code). The outputs of the multipliers 56 are summed by an adder 58. The result of the adder 58 is then squared by component 60. As with the accumulator 10 of FIG. 2, the PNCA search engine 50 operates continuously with a multiplier 62 weighting the "previous" accumulated value by a feedback value α 64 and adding the result, using adder 66, to the next input. The new "previous" accumulated value passes through a shift register 67, which has a dwell of N symbols, before being weighted and added. The results of the adder 66 are further shifted by another value γ 68 being added by an adder 70. The result of the adder 70 then passes to a component 72 that indicates whether the discovery burst preamble has been detected or not. In the exemplary PNCA search engine of FIG. 4, if the input to the component 72 is positive, the preamble has been detected. If the input is negative, the preamble has not been detected.

In other embodiments, a different comparison or measurement may be made to determine or indicate whether the preamble has been detected. In further embodiments, the PNCA search engine may comprise additional stages similar to the stages shown in FIG. 4. In other embodiments, the PNCA search engine may comprise additional stages that are different from those shown in FIG. 4. In further embodiments, the PNCA search engine may comprise additional frequency bins.

Figure 5:
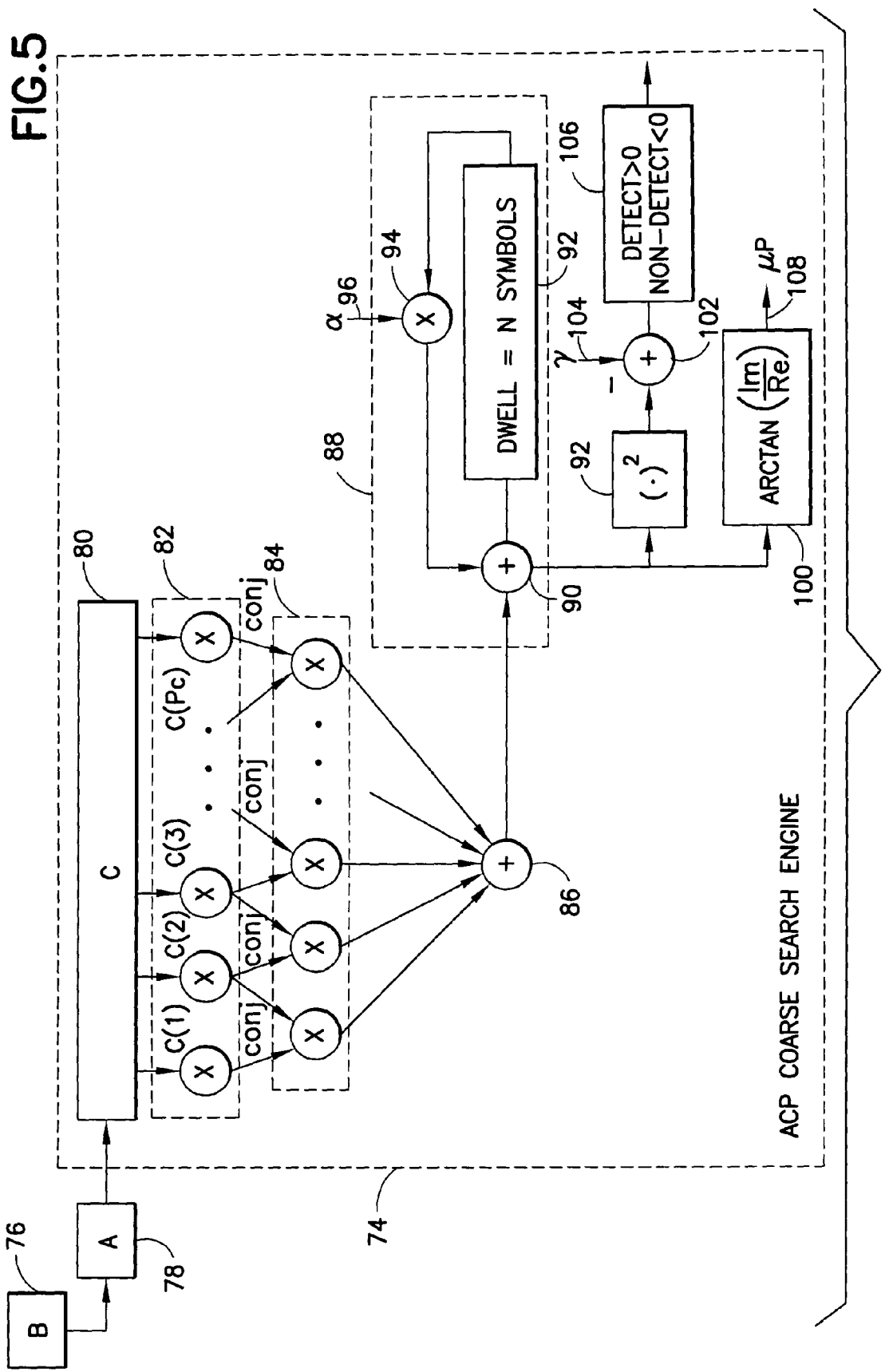
FIG. 5 shows an exemplary Accumulated Cross Product (ACP) search engine.

FIG. 5 shows an exemplary ACP coarse search engine 74. One or more despreaders (e.g., a plurality of despreaders acting in series), represented in FIG. 5 by despreader B 76 and despreader A 78, provide an input to the ACP search engine 74. The input is received by a shift register C 80. A plurality of first multipliers 82 (numbered C(1) through C($P_C$)) apply a function by multiplying the outputs of the register C 80 by a plurality of weights. The output of each one of the first multipliers 82 is then further multiplied by the conjugate of the next successive first multiplier (if there is a next successive multiplier) using a plurality of second multipliers 84. The results of the second multipliers 84 are summed by an adder 86. The result of the adder 86 then enters the sliding window portion 88. The sliding window portion 88 includes an adder 90, a delay register 92 and a multiplier 94. The "previous" value is weighted by the multiplier 94 with a value α 96 and added to the next input by the adder 90, similar to the PNCA search engine of FIG. 4. Note that the delay register 92 effectively delays its inputs by a number of hypotheses (i.e. the dwell of the delay register 92).

The output of the adder 90 is coupled to two further components: a first component 98 and a second component 100. The first component 98 squares the input and outputs the result to another adder 102. The adder 102 shifts the input by a value γ 104 (an energy threshold used for comparison) and passes the result to a third component 106. The third component 106 indicates whether the discovery burst preamble has been detected or not. In the example ACP search engine of FIG. 5, if the input to the third component 106 is positive, the preamble has been detected. If the input is negative, the preamble has not been detected. The second component 100 receives the output of the adder 90 and takes the arctangent of the imaginary portion divided by (i.e. over) the real portion. The resulting value is output to a microprocessor (μP 108) or other component. The second component 100 is configured to consider the angular change, i.e. how much the phase has rotated over time.

In other embodiments, a different comparison or measurement may be made to determine or indicate whether the preamble has been detected. In further embodiments, the ACP search engine 74 may comprise additional stages or "bins" that are similar to the stages shown in FIG. 5. In other embodiments, the ACP search engine 74 may comprise additional stages or "bins" that are different from those shown in FIG. 5. In further embodiments, the μP 108 is a component of the ACP search engine 74. In other embodiments, the μP 108 is not a component of the ACP search engine 74.

The cross product nature of the ACP search engine 74 stems from the use of two sets of multipliers 82, 84. The accumulation nature of the ACP search engine 74 stems from the sliding window portion 88. That is, in other embodiments, the ACP search engine 74 may not include components 98-108. With regards to the operation of the two sets of multipliers 82, 84 and the entire search engine 74 of FIG. 5, reference may be made to commonly-assigned U.S. patent application Ser. No. 11/136,782, "Sub-Sequence Accumulation Filter And Method," the disclosure of which is hereby incorporated by reference in its entirety. The sub-sequence accumulation filter and method of U.S. patent application Ser. No. 11/136,782 may be seen to correspond to the ACP search engine and method of operation thereof as described herein.

The above-described ACP search engine operates in a significantly different manner from the above-described PNCA search engine. While both types of search engines may be considered "correlators" and both are combining circuits that produce a combined result, the ACP search engine is not a despreader, per se. The PNCA search engine, in part, comprises a conventional correlator whose output (e.g. output of the adder 58) is merely a despread signal. In such a manner, the PNCA search engine functions as an energy detector. In contrast, the ACP search engine comprises a differential correlator whereby the ACP search engine correlates differential values rather than absolute values. This enables the ACP search engine to realize additional information from a received signal, such as phase information (e.g. the second component 100), as a non-limiting example.

As further explained below, and with particular reference to FIG. 6, the exemplary embodiments of the invention are not limited to a coarse ACP search engine and may be employed in conjunction with other grades or types of search engines, such as a PNCA search engine and a fine ACP search engine, as non-limiting examples.

The ACP Search Engine may require a longer preamble than the PNCA Search Engine, although it may also have a far lower complexity. Table 1 shows discovery success probability assumptions and results. In Table 1, the parameters for the ACP Search Engine are illustrated. In this table, it is shown that a high single-burst success probability is achievable with a 300 symbol dwell time, assuming that an integrate and dump integrator is perfectly synchronized with the beginning of the burst (e.g. only $1M_{dwell}$ of 300 symbols is needed). If an IIR integrator is instead assumed, then, as previously discussed, the preamble must be 22.6% longer to achieve the same detection and false alarm probabilities. Thus, if a 368-symbol preamble is employed, one will achieve a similarly high overall success probability.

TABLE 1

| | | | |
|---|---|---|---|
| Detection Signal-to-noise ratio considering loss due to fine chip misalignment and carrier offset | $(E_s/N_0)_{Actual}$ | 2.462 | dB |
| Worst Case PN Code Sidelobe Level | $L_{SL}$ | 20.00 | dB |
| ACP Coarse Search Engine (CSE) Parameters | | | |
| CSE Dwell time (symbols) per uncertainty cell | $M_{dwellCSE}$ | 300 | symbols |
| CSE Dwell time (symbols) per uncertainty cell for IIR Sliding Window | $M_{dwellCSE}$ (IIR) | 368 | symbols |
| Suggested Threshold above noise for Pd, coarse of approximately 99.8% | $\gamma_{recommended}$ | 11.80 | times noise |
| Chosen detection threshold above noise in CSE | $\gamma_{CSE}$ | 12.15 | times noise |
| Standard deviation of CSE freq. error | $\sigma_\beta$ | 0.13 | radians |
| P[CSE detect\|aligned] | $P_{d,\,coarse}$ | 0.9967475 | detect rate |
| P[CSE false alarm] | $P_{fa,\,coarse}$ | 5.348345E−06 | false alarm rate |
| Number of bins to search in FSE | $B_{FSE\,bins}$ | 8 | bins |
| P[CSE acceptable frequency error] | $P_{afe,\,coarse}$ | 0.9994005 | detect rate |
| ACP Fine Search Engine (FSE) Parameters (assumes $R_p$ degree rotation allowed between symbols) | | | |
| FSE Dwell time (symbols) per uncertainty cell | $M_{dwellFSE}$ | 275 | symbols |
| FSE Frequency Error Standard Deviation | $\sigma^2_{ACPfine}$ | 3.85 | Hz |
| Burst Receiver's Carrier Loop Capture Range | $B_{capture}$ | 14 | ±Hz |
| P[FSE acceptable frequency error] | P[FSE freq. error < $B_{capture}$] | 0.999723169 | |

Figure 6:
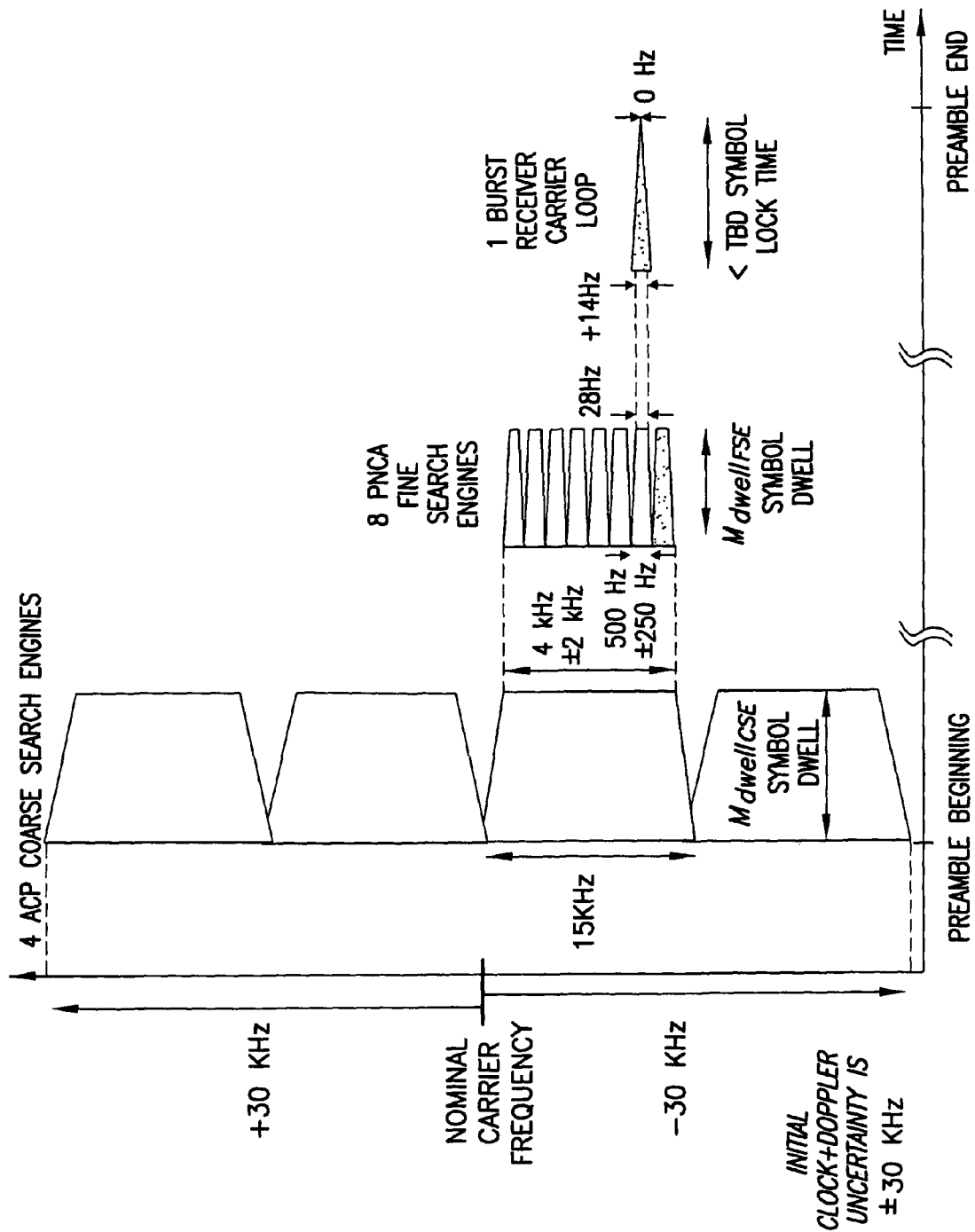
FIG. 6 depicts a plot of the frequency uncertainty versus time for an exemplary frequency acquisition process and system.

In FIG. 6, a plot is shown of the frequency uncertainty versus time for an exemplary frequency acquisition process and system. At the beginning of the preamble, ACP Coarse Search begins and the preamble needs to be long enough to search the entire frequency uncertainty range. The Coarse Search Engine is capable of searching an input frequency uncertainty range of 15 KHz. Thus, the entire 60 KHz input uncertainty range is searched by four ACP Coarse Search Engines in parallel. The Coarse Search Engines provide a rough estimate of the signal location (i.e. as being within a 15 KHz range, based on the uncertainty range of the Coarse Search Engines). Next, eight PNCA Fine Search Engines accept an input and further narrow the output uncertainty range by an amount that depends on how long they average. The input to the PNCA Fine Search Engines comprises the rough estimate provided by the Coarse Search Engine that detects the signal. The PNCA Fine Search Engines center their search on the rough estimate. In the exemplary system of FIG. 6, each of the 8 PNCA Fine Search Engines covers a range of 500 Hz (±250 Hz). Thus the 8 PNCA Fine Search Engines, in total, search a range of 4 KHz (±2 KHz) and produce a fine estimate of the frequency. A Burst Receiver Carrier Loop receives the fine estimate and locks onto the frequency of the signal by searching a range of 28 Hz (±14 Hz).

The exemplary system described by FIG. 6 comprises 3 stages with 4 ACP Coarse Search Engines, 8 PNCA Fine Search Engines and 1 Burst Receiver. In other embodiments, the system may comprise a different number of stages and/or different numbers of constituent components. In further embodiments, a plurality of search engines for a single stage may comprise a plurality of search engines operating in parallel (as shown in FIG. 6) or a single search engine that operates in a linear fashion, as non-limiting examples. In other embodiments, the fine search engine stage and the burst receiver are combined into a single engine. In such a manner, rather than having two delays (as further described below), only one delay is employed. In further embodiments, the system may comprise n stages of fine search engines. In other embodiments, the burst receiver does not need to narrow the frequency to an uncertainty of 0 Hz. As a non-limiting example, a differential non-coherent receiver may be utilized over an uncertainty range (i.e. one that is greater than 0 Hz).

As a non-limiting example, another exemplary system may comprise at least one ACP search engine configured to search a range of 4 KHz (±2 KHz) and output a frequency estimate. A receiver takes the frequency estimate as an input and searches a range of 100 Hz (±50 Hz) to lock onto the signal. As noted above, the output of the receiver may have an uncertainty greater than or equal to 0 Hz. In such a manner, the fine search engine functionality is built into the receiver component.

In Table 1, it was assumed that the ACP Fine Search Engine uses a 275-symbol dwell time to achieve a ±14 Hz carrier frequency uncertainty with 99.97% probability. Thus, if one wants to provide the burst receiver with an initial frequency uncertainty of 28 Hz, that is 14 Hz per side or ±14 Hz, one should use a 275-symbol dwell time for the PNCA Fine Search Engines. In FIG. 6, the PNCA Fine Search Engines begin their dwell after the ACP Coarse Search Engines have completed their dwell. Next the burst receiver carrier loop requires some additional time to lock (perhaps 100 symbols, for example). This implies that the preamble must have a length which is the sum of each of these dwell times (for this example 368+275+100=743 symbols).

Figure 7:
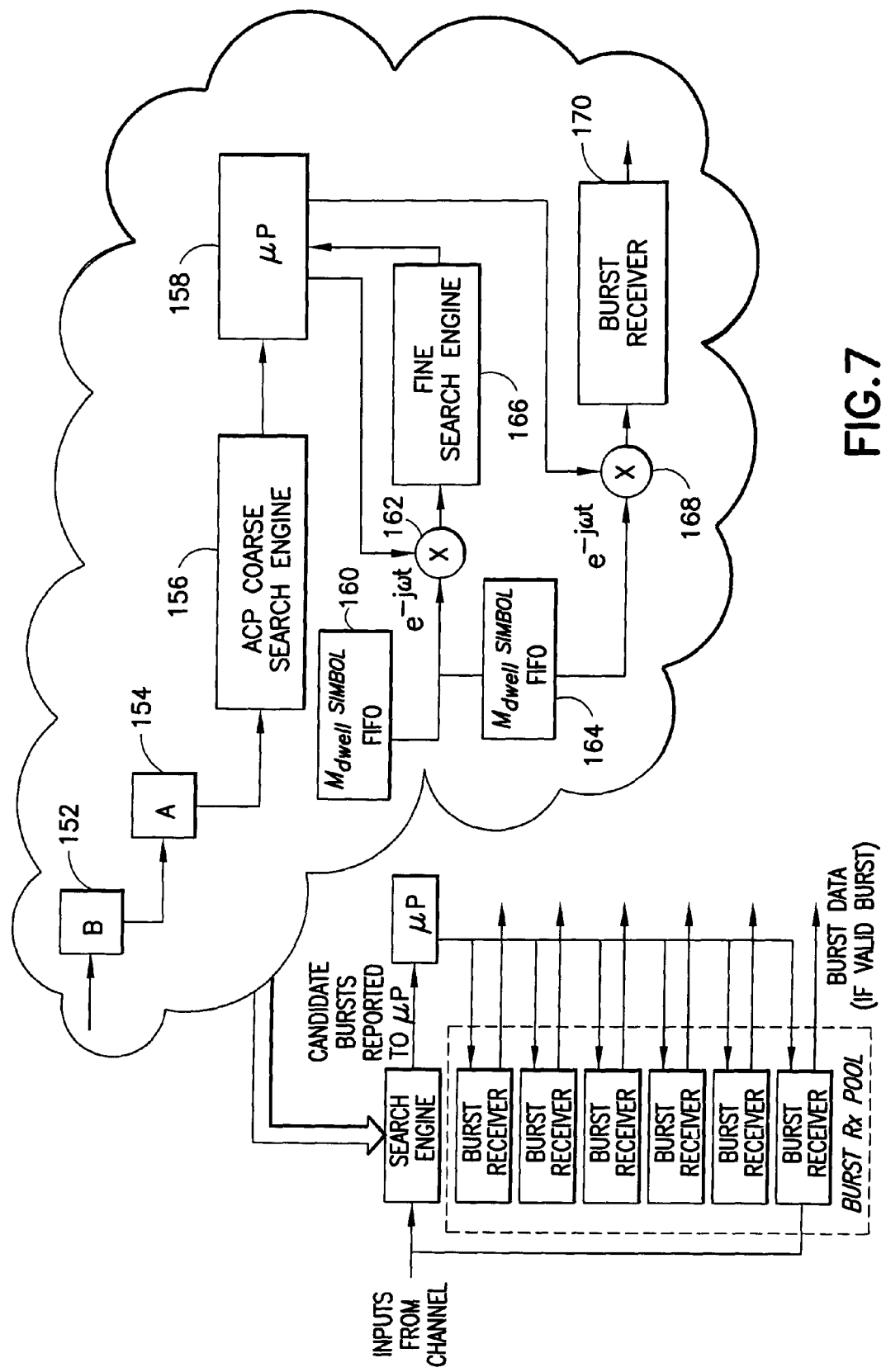
FIG. 7 is a block diagram showing the use of first-in/first-out registers (FIFO) to enable the ACP Fine Search Engine and Burst Receivers to operate "behind in time" relative to the ACP Coarse Search Engine.

Since it is desirable to shorten the preamble as much as possible in a discovery burst, a tradeoff of RAM in the receiver versus preamble size can be achieved using the approach illustrated in FIG. 7.

FIG. 7 is a block diagram showing the use of first-in/first-out registers (FIFOs) to enable the Fine Search Engine and Burst Receivers to operate "behind in time" relative to the ACP Coarse Search Engine. The inputs from the channel are received by two despreaders, despreader B 152 and despreader A 154, in series. The output of despreader A 154 is coupled to an input of an ACP Coarse Search Engine 156 and to an input of a first FIFO 160. The output of the ACP Coarse Search Engine 156 is coupled to an input of a processor (μP) 158. The first FIFO 160 stores a certain number of symbols worth of time for use by a Fine Search Engine 166 and a second FIFO 164, which are also parallel with one another. The output of the first FIFO 160 is coupled to an input of the second FIFO 164 and to an input of a first multiplier 162. The first multiplier 162 receives a first center frequency ($e^{-j\omega t}$) from µP 158 and multiplies the frequency by the output of the first FIFO 160. The first multiplier 162 outputs the result to an input of the Fine Search Engine 166. The output of the Fine Search Engine 166 is coupled to the µP 158. The second FIFO 164 stores a certain number of symbols worth of time for use by a Burst Receiver 170. The output of the second FIFO 164 is coupled to an input of a second multiplier 168. The second multiplier 168 receives a second center frequency ($e^{-j\omega t}$) from µP 158 and multiplies the frequency by the output of the second FIFO 164. The second multiplier 168 outputs the result to an input of the Burst Receiver 170.

As depicted in FIG. 7, the ACP Coarse Search Engine 156 performs an initial search to narrow the frequency uncertainty range. Once the ACP Coarse Search Engine 156 has narrowed the range, the ACP Coarse Search Engine 156 outputs the coarse estimate to the µP 158. The µP 158 sends a center frequency to the first multiplier 162 for use by the Fine Search Engine 166. In such a manner, the Fine Search Engine 166 searches at least a portion of the frequency range centered on the coarse estimate output by the ACP Coarse Search Engine 156, similar to what is shown in FIG. 6. The Fine Search Engine 166 further narrows the frequency uncertainty range and outputs its result, a fine estimate, to the µP 158. The µP 158 sends the center frequency to the second multiplier 168 for use by the Burst Receiver 170 in locking onto the frequency. From the Coarse and Fine Search Engines 156, 166, the µP 158 determines which bursts might be the real burst (i.e. the burst the search engines are attempting to detect and decode). Each Fine Search Engine (e.g., 166) has a center frequency. If there is more than one candidate burst, the µP 158 may send the center frequencies to different parallel burst receivers expecting one of the parallel burst receivers to lock on the signal.

At least a portion of the specific dwell time the ACP Coarse Search Engine 156 searches is stored by the first FIFO 160 for use by the Fine Search Engine 166. At least a portion of the specific dwell time the Fine Search Engine 166 searches is stored by the second FIFO 164 for use by the Burst Receiver 170. The two FIFOs 160, 164 enable the Fine Search Engine 166 and the Burst Receiver 170 to reuse portions of the same dwell time that the ACP Coarse Search Engine 156 uses. In such a manner, a shorter preamble length may be employed because the Fine Search Engine 166 and the Burst Receiver 170 no longer require additional dwell times of their own to search for the frequency.

Although shown in FIG. 7 with only one ACP Coarse Search Engine and one Fine Search Engine, other embodiments may contain more than one of each search engine. Applying the example of FIG. 6 to the system of FIG. 7, four ACP Coarse Search Engines and eight Fine Search Engines may be run in parallel to effectively search the desired frequency uncertainty ranges, as a non-limiting example.

In FIG. 7, FIFOs are utilized to permit the Fine Search Engine to reuse the preamble symbols that were previously used by the ACP Coarse Search Engine. Similarly, additional delay can be inserted to ensure that the Burst Receiver can operate again on the same preamble symbols. For example, if the ACP Coarse Search Engine requires 368 symbols, the Fine Search Engine may require 275 symbols and the Burst Receiver may require 100 symbols, then the first FIFO should store 275 symbols worth (i.e. of the output from despreader A 154) and the second FIFO must store 100 symbols worth. The use of this approach will shorten the preamble from the 743 symbol length stated above to only 368 symbols (the dwell time of the ACP Coarse Search Engine).

The operation of the one or more despreaders of FIG. 4 (despreader A 52), the one or more despreaders of FIG. 5 (despreader B 76 and despreader A 78) and the two despreaders in FIG. 7 (despreader B 152 and despreader A 154) are as described in commonly-assigned U.S. patent application Ser. No. 10/915,777, "Multi-Rate Spread Spectrum Composite Code," the disclosure of which is hereby incorporated by reference in its entirety.

The operation of other components shown in FIG. 7 (e.g. Burst Receivers, Burst Receiver Pool, processor) are as described in commonly-assigned U.S. patent application Ser. No. 11/136,783, "Method And Apparatus To Initiate Communications Between An Unknown Node And An Existing Secure Network," the disclosure of which is hereby incorporated by reference in its entirety.

As described herein, the exemplary embodiments of the invention may be employed in conjunction with spreading codes as described in commonly-assigned U.S. patent application Ser. No. 10/915,776, "Doped Multi-Rate Spread Spectrum Composite Code," the disclosure of which is hereby incorporated by reference in its entirety.

As described herein, the exemplary embodiments of the invention may also be employed in conjunction with spreading codes as described in commonly-assigned U.S. patent application Ser. No. 11/259,336, "Methods And Apparatus Implementing Short And Long Code Channel Overlay For Fast Acquisition Of Long PN Codes In Spread Spectrum Communications Systems," the disclosure of which is hereby incorporated by reference in its entirety.

As described herein, the exemplary embodiments of the invention may be employed in conjunction with one or more search engines as described in commonly-assigned U.S. patent application Ser. No. 11/136,943, "Method And Apparatus for Efficient Carrier Bin Search for a Composite Spreading Code," the disclosure of which is hereby incorporated by reference in its entirety. In addition, the search engines described herein may operate as described in U.S. patent application Ser. No. 11/136,943.

The number of symbols, frequency uncertainties, number of search engines and other corresponding values utilized above are by way of non-limiting examples employed to describe the exemplary embodiments of the invention. In addition, although described above with reference to ACP Search Engines, other types of search engines may be employed. Furthermore, although illustrated above using FIFOs, any component may be employed that fulfills a similar function such that a second search engine is capable of reusing the symbols previously used by a first search engine.

Figure 8:
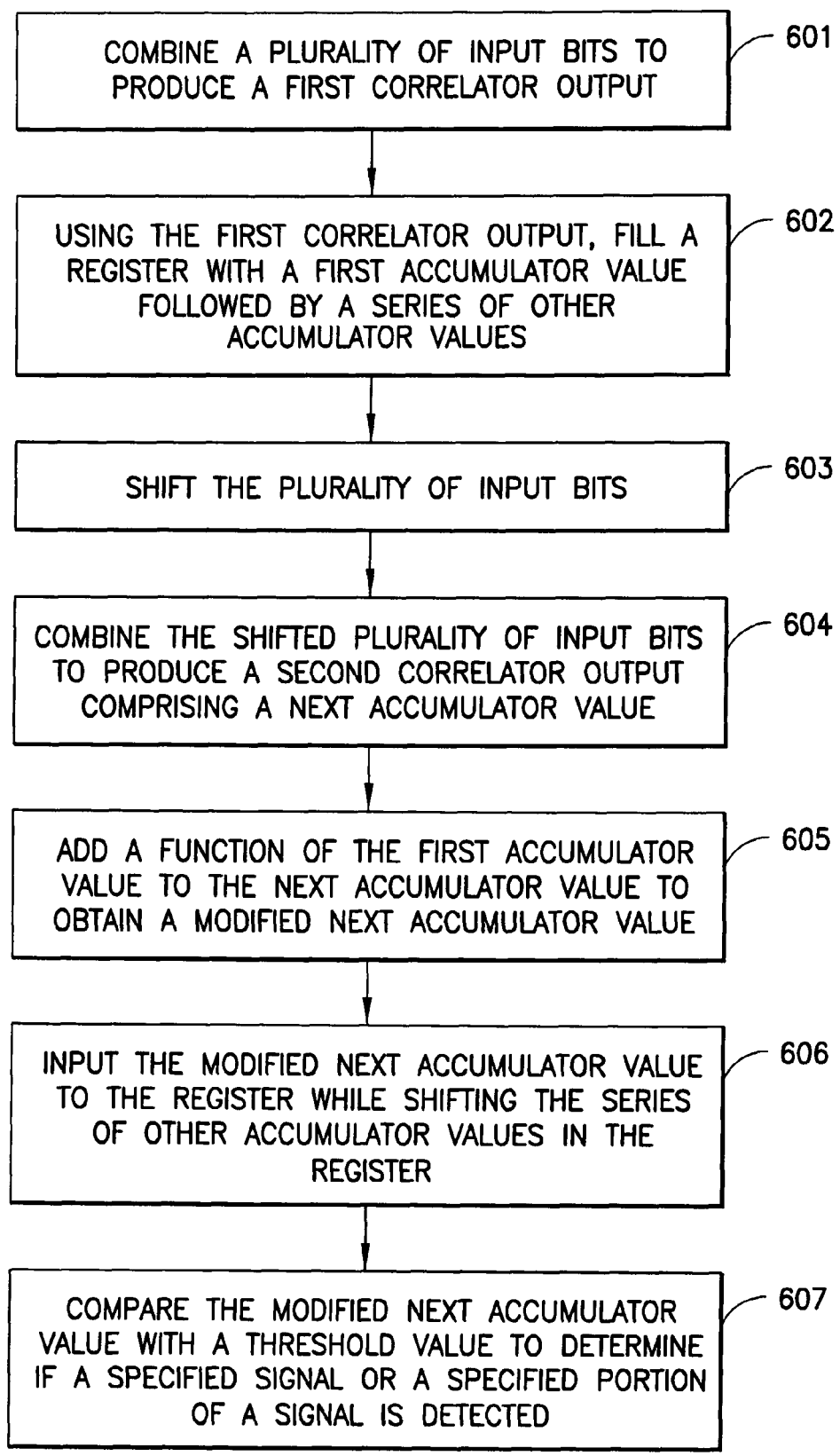
FIG. 8 depicts a flowchart illustrating one non-limiting example of a method for practicing the exemplary embodiments of this invention.

FIG. 8 depicts a flowchart illustrating one non-limiting example of a method for practicing the exemplary embodiments of this invention. The method includes the following steps. In box 601, a plurality of input bits are combined to produce a first correlator output. In box 602, using the first correlator output, a register is filled with a first accumulator value followed by a series of other accumulator values. In box 603, the plurality of input bits are shifted. In box 604, the shifted plurality of input bits are combined to produce a second correlator output comprising a next accumulator value. In box 605, a function of the first accumulator value is added to the next accumulator value to obtain a modified next accumulator value. In box 606, the modified next accumulator value is input to the register while the series of other accumulator values in the register are shifted. In box 607, the modified next accumulator value is compared with a threshold value to determine if a specified signal or a specified portion of a signal is detected.

In other embodiments, the function of the first accumulator value comprises multiplying the first accumulator value by a weighting factor ($\beta$). In other embodiments, the weighting factor ($\beta$) is given by the mathematical equation $\beta=1-(1.26/M)$, where M is the dwell time of a corresponding received signal. In further embodiments, the threshold value comprises an energy level and the steps of shifting, combining to produce a next accumulator value, adding and inputting are repeated for successive shifted pluralities of input bits until an energy level exceeds the threshold value. In other embodiments, combining the plurality of input bits comprises applying a despreading code to the plurality of input bits to obtain a plurality of first results, summing the plurality of first results to obtain a second result, and squaring the second result to obtain the first correlator output, wherein combining the shifted plurality of input bits comprises applying a despreading code to the shifted plurality of input bits to obtain a plurality of second results and summing the plurality of second results to obtain the second correlator output. In further embodiments, the length of the register is twice a length of the despreading code. In other embodiments, combining the plurality of input bits comprises correlating differential values to obtain a plurality of first results and summing the plurality of first results to obtain the first correlator output, wherein combining the shifted plurality of input bits comprises correlating differential values to obtain a plurality of second results and summing the plurality of second results to obtain the second correlator output. In further embodiments, the specified signal or the specified portion of a signal comprises a discovery burst preamble.

As utilized herein, the terms "combining," "a combining circuit" and any other such similar terms refer to the operation of a circuit that receives input bits and combines the received bits to obtain one or more values. As non-limiting examples, a combining circuit may comprise a PNCA search engine (e.g. the PNCA search engine of FIG. 4) or an ACP search engine (e.g., the ACP search engine of FIG. 5).

Figure 9:
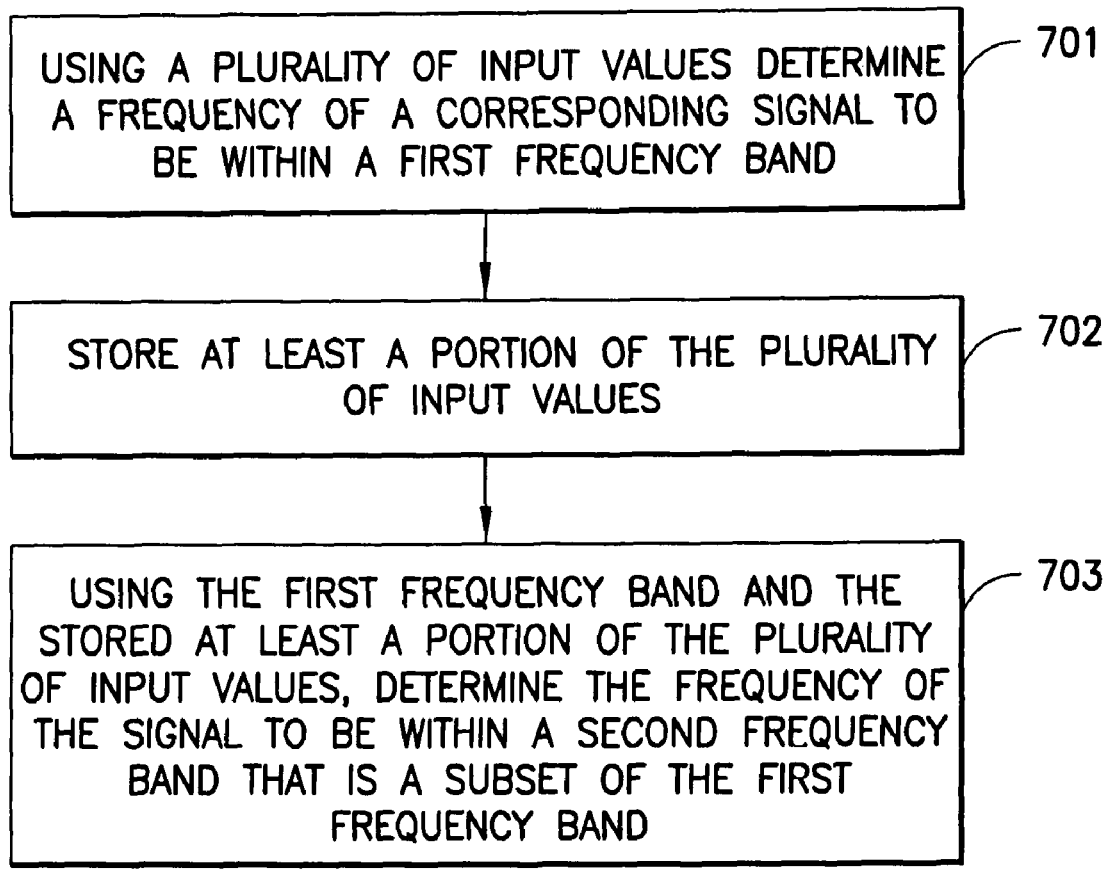
FIG. 9 depicts a flowchart illustrating another non-limiting example of a method for practicing the exemplary embodiments of this invention.

FIG. 9 depicts a flowchart illustrating another non-limiting example of a method for practicing the exemplary embodiments of this invention. The method includes the following steps. In box 701, using a plurality of input values, a frequency of a corresponding signal is determined to be within a first frequency band. In box 702, at least a portion of the plurality of input values are stored. In box 703, using the first frequency band and the stored at least a portion of the plurality of input values, the frequency of the signal is determined to be within a second frequency band, where the second frequency band is a subset of the first frequency band.

In other embodiments, storing the at least a portion of the plurality of input values comprises using a delay component. In further embodiments, the delay component comprises a first-in/first-out (FIFO) register. In other embodiments, the method further comprises: using the second frequency band and the stored at least a portion of the plurality of input values, determining the frequency of the signal to be within a third frequency band that is a subset of the second frequency band. In further embodiments, the method further comprises: storing at least a portion of the stored plurality of input values, and wherein determining the frequency to be within the third frequency band comprises using the stored at least a portion of the stored plurality of input values. In other embodiments, the method of FIG. 9 is employed in conjunction with the method of FIG. 8.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An electronic device comprising:
   a first frequency search engine configured to receive a plurality of input values and to determine a frequency of a corresponding signal to be within a first frequency band, the first frequency search engine comprising:
   a shift register, having an input coupled to an input of the first frequency search engine, configured to store bits of the input values;
   a combining circuit, having an input coupled to an input of the first frequency search engine, configured to combine bits of the plurality of input values to produce a correlator output;
   a first delay component, having an input coupled to an output of the combining circuit, configured to serially store a plurality of accumulator values, wherein the serially-stored plurality of accumulator values comprises the correlator outputs; and
   a feedback circuit, coupled to the first delay component, configured to add a function of an output of the first delay component to a next accumulator value of the first delay component to obtain a modified next accumulator value, wherein the output of the first delay component is coupled to an output of the first frequency search engine;
   a second delay component, having an input coupled to an input of the first frequency search engine, configured to store at least a portion of the plurality of input values; and
   a second frequency search engine, having inputs coupled to an output of the second delay component and to an output of the first frequency search engine, configured, using the stored at least a portion of the plurality of input values and the first frequency band, to determine the frequency of the signal to be within a second frequency band, where the second frequency band is a subset of the first frequency band.

2. A method comprising:
   combining a plurality of input bits to produce a first correlator output, wherein combining the plurality of input bits comprises correlating differential values to obtain a plurality of first results and summing the plurality of first results to obtain the first correlator output;
   using the first correlator output, filling a register with a first accumulator value followed by a series of other accumulator values;
   shifting the plurality of input bits;

combining the shifted plurality of input bits to produce a second correlator output comprising a next accumulator value, wherein combining the shifted plurality of input bits comprises correlating differential values to obtain a plurality of second results and summing the plurality of second results to obtain the second correlator output;

adding a function of the first accumulator value to the next accumulator value to obtain a modified next accumulator value;

inputting the modified next accumulator value to the register while shifting the series of other accumulator values in the register; and comparing the modified next accumulator value with a threshold value to determine if a specified signal or a specified portion of a signal is detected.

3. The method of claim 2, wherein the function of the first accumulator value comprises multiplying the first accumulator value by a weighting factor ($\beta$).

4. The method of claim 3, wherein the weighting factor ($\beta$) is given by the mathematical equation $\beta=1-(1.26/M)$, where M is the dwell time of a corresponding received signal.

5. The method of claim 2, wherein the threshold value comprises an energy level, wherein the steps of shifting the plurality of input bits, combining the shifted plurality of input bits, adding the function of the first accumulator value and inputting the modified next accumulator value to the register while shifting the series of other accumulator values in the register are repeated for successive shifted pluralities of input bits until an energy level of the modified next accumulator value exceeds the threshold value.

6. The method of claim 2, wherein combining the plurality of input bits comprises applying a despreading code to the plurality of input bits to obtain a plurality of first results, summing the plurality of first results to obtain a second result, and squaring the second result to obtain the first correlator output, wherein combining the shifted plurality of input bits comprises applying the despreading code to the shifted plurality of input bits to obtain a plurality of second results and summing the plurality of second results to obtain the second correlator output.

7. The method of claim 6, wherein a length of the register is twice a length of the despreading code.

8. The method of claim 2, wherein the specified signal or the specified portion of a signal comprises a discovery burst preamble.

9. An apparatus comprising:
a combining circuit configured to combine a plurality of input bits to produce a correlator output by correlating differential values to obtain a plurality of first results and summing the plurality of first results to obtain the first correlator output, wherein the combining circuit is further configured to combine a shifted plurality of the input bits to produce a next correlator output by correlating differential values to obtain a plurality of second results and summing the plurality of second results to obtain the second correlator output;

a delay register, having an input coupled to an output of the combining circuit, configured to serially store a plurality of accumulator values, wherein the serially-stored plurality of accumulator values comprises the correlator outputs; and a feedback circuit, coupled to the delay register, configured to add a function of an output of the delay register to a next accumulator value of the delay register to obtain a modified next accumulator value.

10. The apparatus of claim 9, wherein the function comprises multiplying the output of the delay register by a weighting factor ($\beta$).

11. The apparatus of claim 10, wherein the weighting factor ($\beta$) is given by the mathematical equation $\beta=1-(1.26/M)$, where M is the dwell time of a corresponding received signal.

12. The apparatus of claim 9, wherein the combining circuit comprises a shift register, a plurality of first multipliers, an adder and a squaring circuit, wherein the shift register has an input coupled to an input of the apparatus, wherein the shift register is configured to store the plurality of input bits, wherein the plurality of first multipliers has a plurality of inputs coupled to at least one output of the shift register, wherein the plurality of first multipliers is configured to apply a despreading code to contents of the shift register to obtain a plurality of first results, wherein the adder is configured to add together the plurality of first results and obtain a second result, wherein the squaring circuit is configured to square the second result to obtain a correlator output.

13. The apparatus of claim 12, wherein the length of the delay register is twice a length of the despreading code.

14. The apparatus of claim 9, wherein the combining circuit comprises a shift register, a plurality of first multipliers, a plurality of second multipliers and an adder, wherein the shift register has an input coupled to an input of the apparatus, wherein the shift register is configured to store the plurality of input bits, wherein the plurality of first multipliers has a plurality of inputs coupled to at least one output of the shift register, wherein the plurality of second multipliers has a plurality of inputs coupled to a plurality of outputs of the plurality of first multipliers, wherein the plurality of first multipliers and the plurality of second multipliers are configured to perform a cross-product operation on the contents of the shift register to obtain a plurality of first results, wherein the adder is configured to add together the plurality of first results and obtain a correlator output.

15. The apparatus of claim 9, further comprising a decision circuit, coupled to the delay register, configured to compare an energy of the modified next accumulator value with a threshold value to determine if a specified signal or a specified portion of a signal is detected.

16. A method comprising:
using a plurality of input values received at an electronic device, determining within the electronic device a frequency of a corresponding signal to be within a first frequency band;

storing within the electronic device at least a portion of the plurality of input values;

using the stored at least a portion of the plurality of input values, determining within the electronic device the frequency of the signal to be within a second frequency, wherein the second frequency band is a subset of the first frequency band; and using the second frequency band and the stored at least a portion of the plurality of input values, determining within the electronic device the frequency of the signal to be within a third frequency band, wherein the third frequency band is a subset of the second frequency band.

17. The method according to claim 16, wherein a burst receiver is used for determining the frequency of the signal to be within a third frequency band.

18. A method comprising:
using a plurality of input values, determining a frequency of a corresponding signal to be within a first frequency band;

storing at least a portion of the plurality of input values;

using the stored at least a portion of the plurality of input values, determining the frequency of the signal to be within a second frequency, wherein the second frequency band is a subset of the first frequency band; and using the second frequency band and the stored at least a portion of the plurality of input values, determining the frequency of the signal to be within a third frequency band, wherein the third frequency band is a subset of the second frequency band, wherein storing the at least a portion of the plurality of input values comprises using a delay component.

19. The method of claim 18, wherein the delay component comprises a first-in/first-out (FIFO) register.

20. The method of claim 18, further comprising: storing at least a portion of the stored plurality of input values, and wherein determining the frequency to be within the third frequency band comprises using the stored at least a portion of the stored plurality of input values.

21. An apparatus comprising:
a first frequency search engine configured to receive a plurality of input values and to determine a frequency of a corresponding signal to be within a first frequency band;
a delay component, having an input coupled to an input of the first frequency search engine, configured to store at least a portion of the plurality of input values;
a second frequency search engine, having inputs coupled to an output of the delay component and to an output of the first frequency search engine, configured, using the stored at least a portion of the plurality of input values and the first frequency band, to determine the frequency of the signal to be within a second frequency band, where the second frequency band is a subset of the first frequency band; and
a third frequency search engine, having inputs coupled to an output of the delay component and to an output of the second frequency search engine, configured to determine the frequency of the signal, wherein the frequency is a subset of the second frequency band.

22. The apparatus of claim 21, wherein the delay component comprises a first delay component and wherein the apparatus further comprises a second delay component, having an input coupled to an output of the first delay component and an output coupled to an input of a third frequency search engine.

23. The apparatus of claim 21, wherein the delay component comprises a first-in/first-out (FIFO) register.

24. The apparatus of claim 21, wherein the first frequency search engine comprises: a register having an input coupled to the input of the first frequency search engine, a plurality of first multipliers having inputs coupled to outputs of the register, an adder having an input coupled to the outputs of the plurality of first multipliers, and a squaring circuit having an input coupled to the output of the adder, wherein the register is configured to store a portion of the plurality of input values, wherein the plurality of first multipliers is configured to apply a despreading code to contents of the register to obtain a plurality of first results, wherein the adder is configured to add the plurality of first results to obtain a second result, wherein the squaring circuit is configured to square the second result to obtain a correlator output.

25. The apparatus of claim 21, wherein the first frequency search engine comprises a register having an input coupled to the input of the first frequency search engine, a plurality of first multipliers having inputs coupled to outputs of the register, a plurality of second multipliers having a plurality of inputs coupled to a plurality of outputs of the plurality of first multipliers and an adder having an input coupled to the outputs of the plurality of second multipliers, wherein the register is configured to store a portion of the plurality of input values, wherein the plurality of first multipliers and the plurality of second multipliers are configured to cross-multiply the contents of the register to obtain a plurality of first results, wherein the adder is configured to add the plurality of first results to obtain a correlator output.

26. The apparatus according to claim 21, wherein the third frequency search engine comprises a burst receiver.

27. An apparatus comprising:
means for receiving a plurality of input values;
means for determining a frequency of a signal corresponding to the plurality of input values to be within a first frequency band;
first means for storing at least a portion of the plurality of input values;
second means for storing at least a portion of the at least portion of the plurality of input values; and
using the first frequency band and the stored at least a portion of the plurality of input values, means for determining the frequency of the signal to be within a second frequency band wherein the second frequency band is a subset of the first frequency band and further for determining the frequency of the signal to be within a third frequency band where the third frequency band is a subset of the second frequency band.

28. The apparatus of claim 27, wherein an input of the first means for storing is coupled to an output of the means for receiving, wherein an input of the means for determining the frequency to be within the first frequency band is coupled to an output of the means for receiving, wherein an input of the means for determining the frequency to be within the second frequency band is coupled to an output of the means for storing, wherein a first input of the means for determining the frequency to be within the third frequency band is coupled to an output of the second means for storing, wherein a second input of the means for determining the frequency to be within the third frequency band is coupled to an output of the means for determining the frequency to be within the second frequency band.

29. The apparatus according to claim 27, wherein the means for determining the frequency of the signal to be within a third frequency band comprises a burst receiver.

* * * * *